US006735575B1

(12) United States Patent
Kara

(10) Patent No.: US 6,735,575 B1
(45) Date of Patent: May 11, 2004

(54) VERIFYING THE AUTHENTICITY OF PRINTED DOCUMENTS

(75) Inventor: Salim G. Kara, Thornhill (CA)

(73) Assignee: Kara Technology Incorporated, Thornhill (CA)

( * ) Notice: Subject to any disclaimer, the term of this patent is extended or adjusted under 35 U.S.C. 154(b) by 0 days.

(21) Appl. No.: 09/324,241

(22) Filed: Jun. 2, 1999

(51) Int. Cl.[7] .............................................. G06F 17/60
(52) U.S. Cl. .............................. 705/50; 283/57; 283/73
(58) Field of Search .............................. 101/71; 283/53, 283/57, 58, 59, 71, 72, 73, 79, 80, 81, 100, 101, 103, 104, 105, 901, 903; 705/50, 75, 76, 401, 408

(56) References Cited

U.S. PATENT DOCUMENTS

| 4,108,364 | A | * | 8/1978 | Tanaka et al. ............... 235/419 |
| 5,432,506 | A | * | 7/1995 | Chapman ...................... 705/44 |
| 5,598,477 | A | * | 1/1997 | Berson ......................... 380/51 |
| 6,170,744 | B1 | * | 1/2001 | Lee et al. ..................... 235/380 |
| 6,223,166 | B1 | * | 4/2001 | Kay .............................. 705/26 |

FOREIGN PATENT DOCUMENTS

| EP | 0699327 B1 | * | 3/1999 |
| WO | WO-97/14482 A1 | * | 4/1997 |
| WO | WO-00/73954 A2 | * | 12/2000 |

OTHER PUBLICATIONS

"Run Control for Ticket Unit Minimizing Ticket Wastage"; IBM Technical Disclosure Bulletin; Feb. 1, 1974, vol. 16, No. 9. pp. 2998–3001.*

"DATAPRODUCTS: Dataproducts awarded Industrial Design excellence commendation for ATB printer"; Business Editors, Aug. 25, 1987.*

"Technologies match travelers, luggage (New bar code system from Exigent matches airline passengers liggage to tickets throught bar codes; system being used at airports in six US cities)"; Automatic I.D. News, Aug. 1997, vol. 13, No. 9, p. 1.*

"Tickets.com to Invest in Superior In–Home Ticketing Technology"; Business Wire, Feb. 17, 2000, p. 0025.*

* cited by examiner

Primary Examiner—Edward R. Cosimano
(74) Attorney, Agent, or Firm—Fulbright & Jaworski L.L.P.

(57) ABSTRACT

Preprinted forms are used in a general purpose printing device to allow for the subsequent verification of the authenticity of a printed document such as a ticket for transportation services. In operation, the user accesses the seller of the goods/services and during an information exchange with the seller the user inputs at least a portion of the preprinted data from the form. The seller then uses this information to formulate a printable control indicia which is then printed on the form at the user's location. When the form is subsequently presented to the seller, for example when the user attempts to board an aircraft using the form he/she printed, the preprinted portion of the form is used to obtain a decipher key which in turn is used to decipher the control indicia. Inability to decode the control indicia indicates that the printed material on the form may not be authentic.

67 Claims, 9 Drawing Sheets

VERIFYING THE AUTHENTICITY OF PRINTED DOCUMENTS

BACKGROUND

Electronic commerce is everywhere now. People are using the Internet, as well as other remotely accessible locations, such as kiosks, to order goods and/or services. Some of these services require verification of prior payment and/or reservations at the time the service is being offered which typically is sometime after the actual purchase (or reservation) was made. For example, assume a person desires to reserve a seat on an airplane, or a room in a hotel, or a rental car, or a seat in a theatre, all from a remote terminal. Typically, that person would get into communication contact with a reservation system. This communication can be with a live person at the selling end or could be with a computer acting in an interactive mode or a combination of the two. The reservation would be made and arrangements would be made to pay for the reservation. Then the problem arises; how does the purchaser demonstrate to the gatekeeper at the airline (or to the rental car gatekeeper; or to the theatre usher) that the service has been paid for?

The obvious answer is that a ticket, or other indicia of the transaction, is printed at the purchaser's terminal and that printed ticket is used to identify that the services have been paid for. That might work when the paper stock that the receipt information is printed on is closely guarded and very distinctive. It will not work for obvious reasons where general purpose printers are used to print the receipt at the purchaser's premises.

If electronic commerce is to flourish then it is mandatory to have an arrangement whereby the purchaser can obtain immediately upon purchase a printed verification of the transaction in a manner which allows for universal printing while still allowing the printed receipt to act as a final verification of authenticity at the point where the actual services are rendered.

SUMMARY OF THE INVENTION

These and other objects, features and technical advantages of my invention have been achieved in one embodiment where a system and method is utilized for establishing a commercially available partially preprinted form where the form has printed on it information used by the service seller during the initial transaction communication period for establishing integrity control for subsequent verification. In one embodiment, the form is available to any purchaser for use with any general purpose printer operable in conjunction with a PC or other communication/computing device, including so called "dumb" terminals. This form is advantageously preprinted with both human readable data and machine readable data. As will be seen, the machine readable data, which I will call an indicia, contains key information which serves to help decode material that is subsequently printed on the form under control of the central validating system.

In operation, the purchaser enters into an interaction communication with the seller of the service. This may be, by way of illustration, from the purchaser's PC at his/her home via the Internet to a web site maintained by the seller. The user has obtained one or more preprinted paper forms from a supplier of forms. The weight of the paper is not critical and the forms may be any weight stock. The user inputs the human readable data from the exact preprinted form that the user intends to use. This input can be by verbally reading the data or by scanning the data or by any other system. In situations when there is no human readable material preprinted on the form, the user would scan in the machine readable portion. Some portion of the preprinted data is unique to the exact form selected by the user at that time.

The seller, upon receipt of the unique data from the user pertaining to the selected form, verifies that this exact form identification number has not been previously used. Since each preprinted form has a unique identification code, this initial screening process insures that a copy of the preprinted form is not being used. The seller then uses the unique identification number to establish an encryption code for printing on the form a machine readable security indicia. It will be this security indicia that will subsequently be used in conjunction with the original preprinted indicia to verify the authenticity of the information to be printed on the form. The seller then sends information to user so that the user's printer will print on the form all of the information that will be used by the purchaser to subsequently obtain the service.

When the purchaser arrives at the location where the services are to be rendered (in our example, at the airport) the purchaser's form will contain luggage labels (printed when the security indicia was printed) and a boarding pass. A receipt will also be printed at the time the security indicia was printed. The boarding pass contains all of the information necessary to properly route the luggage to the final destination. This routing information may be both human readable and mechanically readable, perhaps in several different formats.

For verification of the authenticity of the boarding pass and/or the luggage tags, the original preprinted indicia is read to obtain a decryption key. This key is then used to decrypt information stored in the security indicia that was printed at the time the remainder of the form information was printed. If the key is not present on the preprinted form, or if the key differs from the key assigned to that form in conjunction with the human readable data that was inputted by the purchaser during the initial payment and/or scheduling session, then the data on the form will not be verified and the holder of the form (boarding pass) will be denied service.

Note that the printer can be any printing device for creating images on paper, or it could be a device for storing images which can later be displayed to obtain the goods and or services. For example, the image can be created into a memory and that memory can be later used to create a display, or to print a paper or other media copy, which is scanned or observed by a gatekeeper at the point where the services are to be rendered. The recreated image can be electronically scanned using the preestablished key to decode the newly created validity information. Such a system can be useful when a memory device, such as a smart card or PC, is used to gain access to a theatre, to rent a car or to board an airplane. In such a system, the memory device interacts with the seller of the service at an earlier point in time, usually several days or weeks earlier, and during that interaction availability of the service is confirmed, a reservation is made, payment is arranged for, seat assignments issued, and images (or other forms of data) are recorded in the memory in a manner such that such images will not be verifiable unless they are decoded using some portion of the preestablished memory data.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWING

For a more complete understanding of the present invention, and the advantages thereof, reference is now made to the following descriptions taken in conjunction with the accompanying drawing, in which.

DETAILED DESCRIPTION

Figure 1:
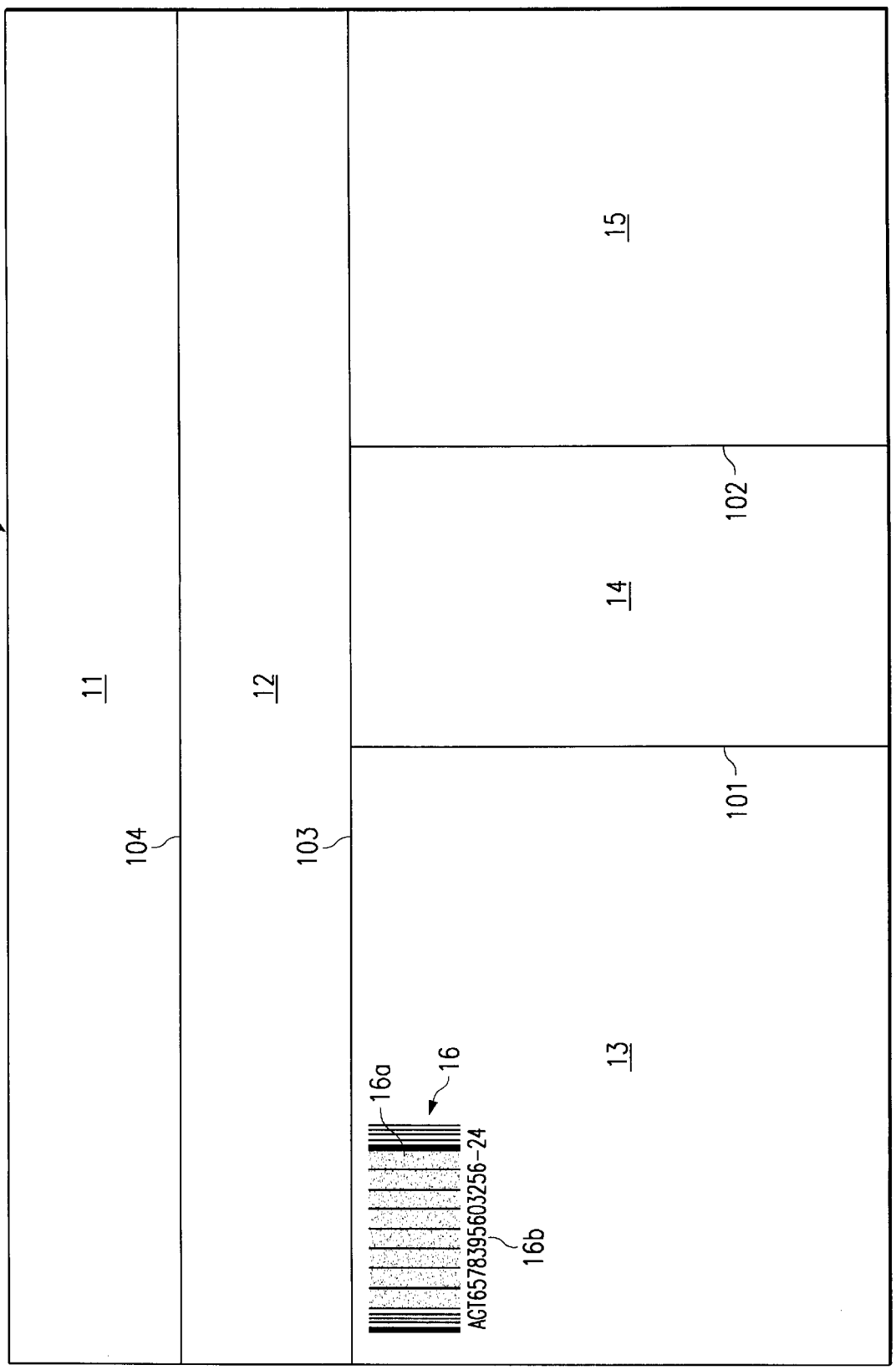
FIG. 1 shows a sample preprinted blank form.

Turning now to FIG. 1, form 10 is the original display media which, in one embodiment, can be ticket stock printed with indicia 16 thereon. Indicia portion 16a can be a machine readable portion of the indicia (which can be, for example a Universal Bar Code, an Intermec Corporations' Code 49, or a Laser Light System Inc.'s Code 16K, or any other type of machine readable code) and portion 16b is a human readable portion. Note that for the purposes of this invention the indicia can be entirely machine readable or entirely human readable, if desired. In addition, the human readable portion could be a different form of the indicia, such as bar codes that can be machine readable. In the embodiment, form 10 is divided into sections 11, 12, 13, 14 and 15 each separable by perforated lines 101, 102, 103 and 104. These lines can be traditional perforations, or they can be simple folds. In some situations there need not be any perforations or folds.

Figure 2:
FIG. 2 shows the form of FIG. 1 having created thereon luggage tags and a boarding pass.

As will be seen in FIG. 2 for an airline ticket portion 13 of ticket stock 10 is printed with the necessary boarding information. In such a situation, section 14 would be the passenger's copy of the boarding pass, section 15 would be the passenger's receipt, and sections 11 and 12 would be the luggage tags that would be preprinted. Thus, the luggage tags can be removed from the printer and ticket stubs 13, 14 and 15 can be separated along the perforation lines. Paper on the backing of the ticket stub area (not shown) can be removed to reveal a portion which has a sticky substance thereon which would allow the tags to be placed in the traditional manner on the luggage to form a loop around the handle.

Figure 3:
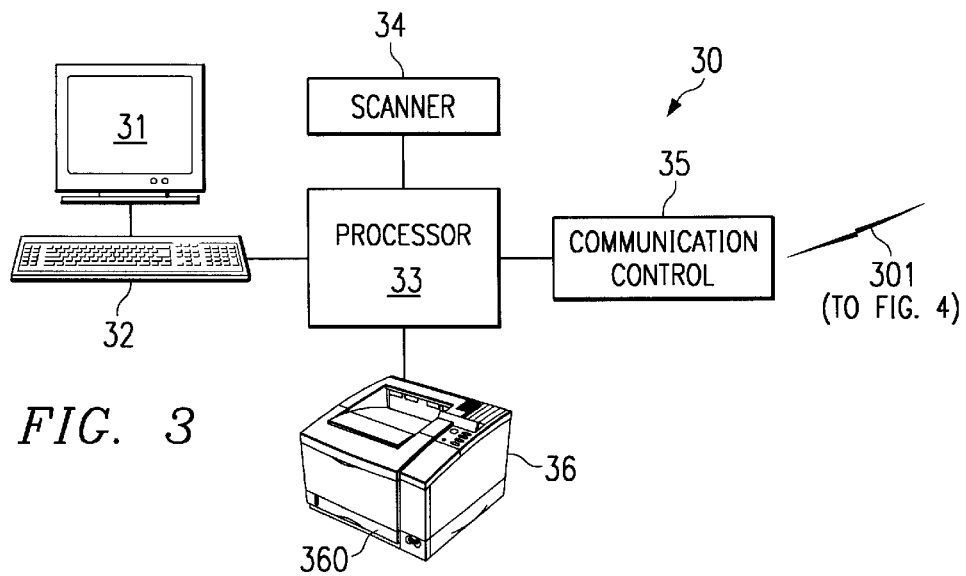
FIG. 3 shows a typical user workstation.
Figure 4:
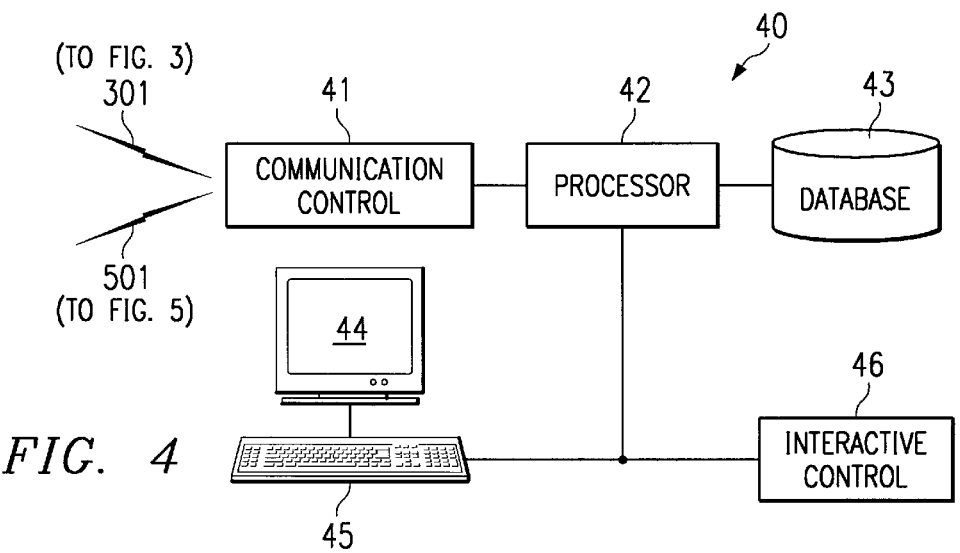
FIG. 4 shows a typical seller work system.

Turning now to FIG. 3, a user using system 30 who has obtained one or more portions of ticket stock 10 places a ticket form or a series of ticket forms 10 in paper tray 360 of printer 36 which is connected to processor 33, which in turn accepts inputs back and forth between keyboard 32, display 31, scanner 34 and communication control 35. The user then makes communication contact with a seller (FIG. 4) via communication control 35 and signal link 301. Signal link 301 could be wireless, wireline, or any other combination system. The internet can be used for this purpose or direct phone line connections combinations thereof. In a typical situation, software would be controlled by processor 33 and the user of keyboard 32 and display 31 would interact with the seller at system 40 FIG. 4 to arrive at a desired flight, cost, time, seat assignment, return trip, or intermediate stops. This would all be accomplished in a well known fashion, either verbally on both parts, or by one or both parties communicating without the intervention of a human on either of both sides. The user at system 30 and the seller at system 40 come to a meeting of the minds with respect to the payment and other terms. The user at 30, either verbally or via scanner 34 (which can be part of printer 36 if desired) reads off the human readable portion of code 16b shown in FIG. 1.

This data is communicated via link 301 to communication control 41 and processor 42. Processor 42 operates in conjunction with data base 43 and determines whether the code that has just been received from the preprinted form is a valid code. This determination can be based upon several factors, one factor being that the code has never been used before, thereby ensuring that it at least appears to be unique to this form. Also, the verification can determine whether the code number is within an acceptable range for this user. Various other parameters can be checked. In one embodiment, processor 42 working in conjunction with data base 43, would know that the original machine readable indicia on ticket stock 10 portion 16a has contained within it a particular key which had been preassigned prior to the printing of the ticket stock. Processor 42 then utilizes a coding algorithm which is secret to it, but which is based on the key contained in the original printed indicia. Utilizing this information, processor 42 formulates a printed message which is transmitted via communication channel 301 to FIG. 3 system 30 and via communication control 35 to processor 33 which then controls printer 36 to print the ticket such as is shown in FIG. 2.

Note that the printed ticket in FIG. 2 has a second indicia 21 which is machine readable similar to indicia 16a and decodable only by utilizing the key which is contained in indicia 16a. Indicia 21 has been especially created by processor 42 in FIG. 4 under control of the previously transmitted data from the buyer and will serve to verify the authenticity of the ticket when the user arrives at the terminal for boarding the airplane, or when the user, in another situation, arrives at a theater. The printed control indicia is compared using the embedded key from the original indicia to decode the printed indicia to authenticate the validity of the ticket. As previously discussed, this can be used for renting cars where the actual information is given to the user preprinted ahead of time at the user's location and the printed indicia is used to allow the car to be removed from the lot via the mechanism above described. Note that more than one control indicia, or key indicia, can be printed on any form.

Figure 5:
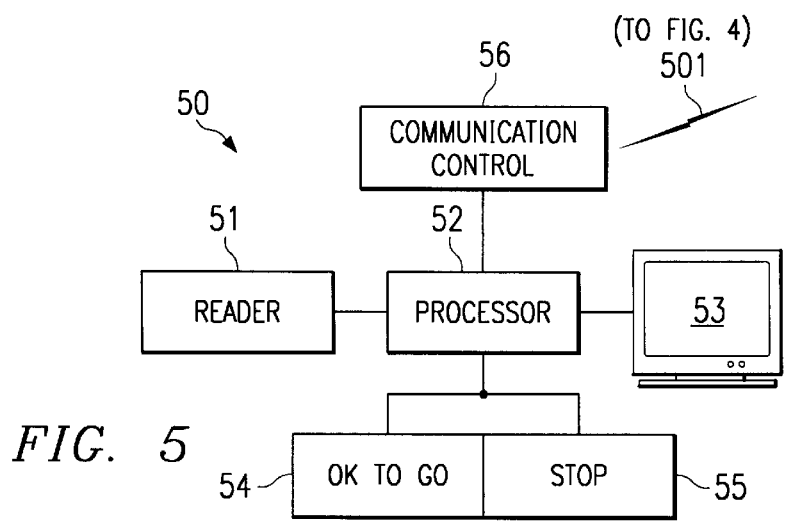
FIG. 5 shows a typical point of sale verification system.

Turning now to system 50 of FIG. 5, when the user arrives at the point of utilization, i.e., the boarding gate of the airline, bus station, train station, or at the exit gate of the rental car agency, or at the entrance to the theater (so that the preprinted commercial transaction is about to be authenticated and the services actually rendered based upon a preestablished commercial transaction between the parties) reader 51 reads the information that is on the preprinted ticket including the original indicia 16a and the new indicia 21. This information is provided to processor 52 which then extracts the key from the data contained in indicia 16 for decoding the data in indicia 21, thereby enabling a determination that the passenger is okay to go 54, via display 53, or that the ticket is not valid 55, via display 53. Processor 52 can transmit and receive information via communication control 56 overlink 501 to communication control 41 in FIG. 4. The purpose of this link can be two fold if desired. 1) When the initial transaction is consummated, processor 42 can operate to transmit the information via link 501 to processor 52 and its database (not shown) indicating that certain information has been printed on various tickets. This would serve as a further backup to the decision process at the time of offering of the services since the indicia that has been printed is expected at that period of time from the information given at the time of the booking. For example, seat information and other information including information pertaining to the printed indicia 21 can be communicated to processor 52 so that when printed indicia 21 is presented, processor 52 can utilize its intelligence to determine the validity of the printed indicia to further check that copies are not made and that the services are not given to the wrong person or to many people utilizing the same numbers.

This system cuts down on fraudulent operations and even if an unscrupulous operator were to make copies of a printed ticket, only one such ticket could be processed at processor 52 because the second one would block since it would no longer be valid for transport or for the rendition of services. Thus, the user of the ticket stock would be in no different position than if the user were to obtain a ticket and have somebody steal the ticket and/or copy the ticket, since control indicia 21 would only have been printed upon the consummation of a commercial transaction, which implies that a means of payment had been agreed upon between the parties.

Figure 6:
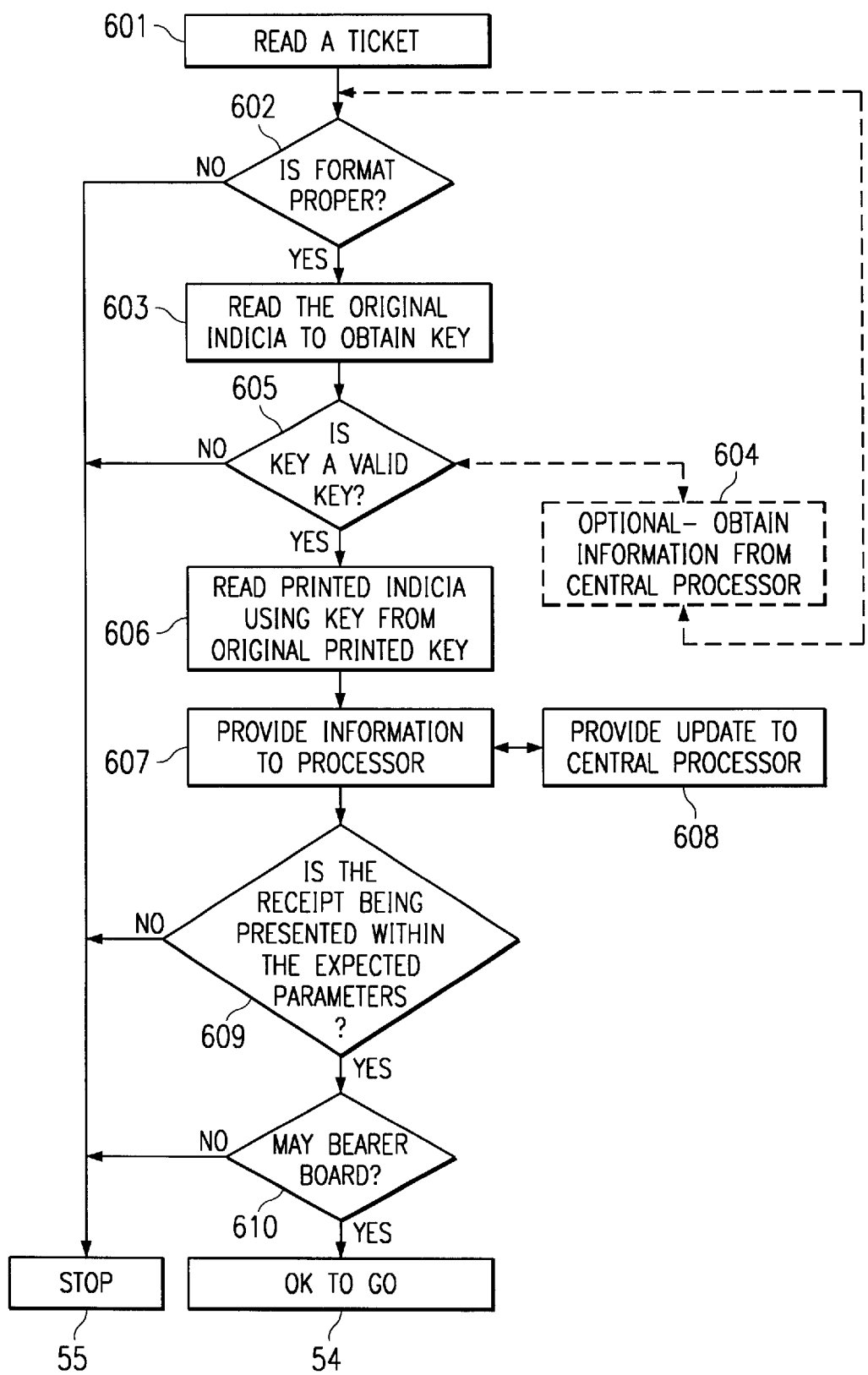
FIG. 6 shows a simple algorithm for authenticating the printed form.

Turning now to FIG. 6, a simple flow chart is shown to show the operation just described and box 601 of the ticket is read and box 602 determines if the format of the entire ticket including indicia 16a and 21 is accurate and proper. In this respect there can be, if desired, interaction between information at the local service rendering position and the central data base box 604. If the format is wrong, the transaction is stopped via box 602. If the format is proper, then the original indicia is read box 603 to determine the key which would be used to decode indicia 21 prior to such utilization of the key. The key is checked via box 605 to determine if it is a valid key. If the key is not valid, the transaction is stopped by proceeding to box 55. Again this validity check can be done in cooperation with information received from the central data base, if desired, via box 604. If it is a valid key, then the key is used to decode the information from the printed indicia box 606 which provides information to processor 607 which verifies the authenticity of the data on the remainder of the ticket and determines (optional) if the parameters (time, date, sequence, etc.) are correct for the passenger of this receipt box 609. If the ticket (receipt) being presented is not within the expected parameters, the transaction is stopped by proceeding to box 55. If the ticket (receipt) being presented is within the expected parameters, the transaction continues to box 610. Again this information can be used to update the central processor 608 if desired to maintain central control. Box 610 controls whether the bearer may board or enter the feeder or remove a car from the lot or any other commercial transaction controlled by the ticket or other display utilized at the time of the actual rendering of the service or the obtaining of the goods where the goods or services have been paid for in a prior arranged commercial transaction. If the bearer may board, the transaction proceeds to box 54. If not, the transaction is stopped via box 55.

Note that while we have been discussing airlines and rental cars and theaters, this same procedure can be used to obtain merchandise at one point in time where the merchandise has been preordered and prepaid for and receipts generated at a home or office at a general purpose printer using special paper stock which has been printed on a unique identification code. These codes have been used to create a separate indicia which is coded with a decoding being controlled by a key obtained from the originally printed indicia. Also note that while we have been discussing material forms, this system could work just as well with an electronic display device visual or otherwise where certain portions of the data can be electronically coded and subsequently decoded utilizing a key which is contained in the original information.

Figure 7A:
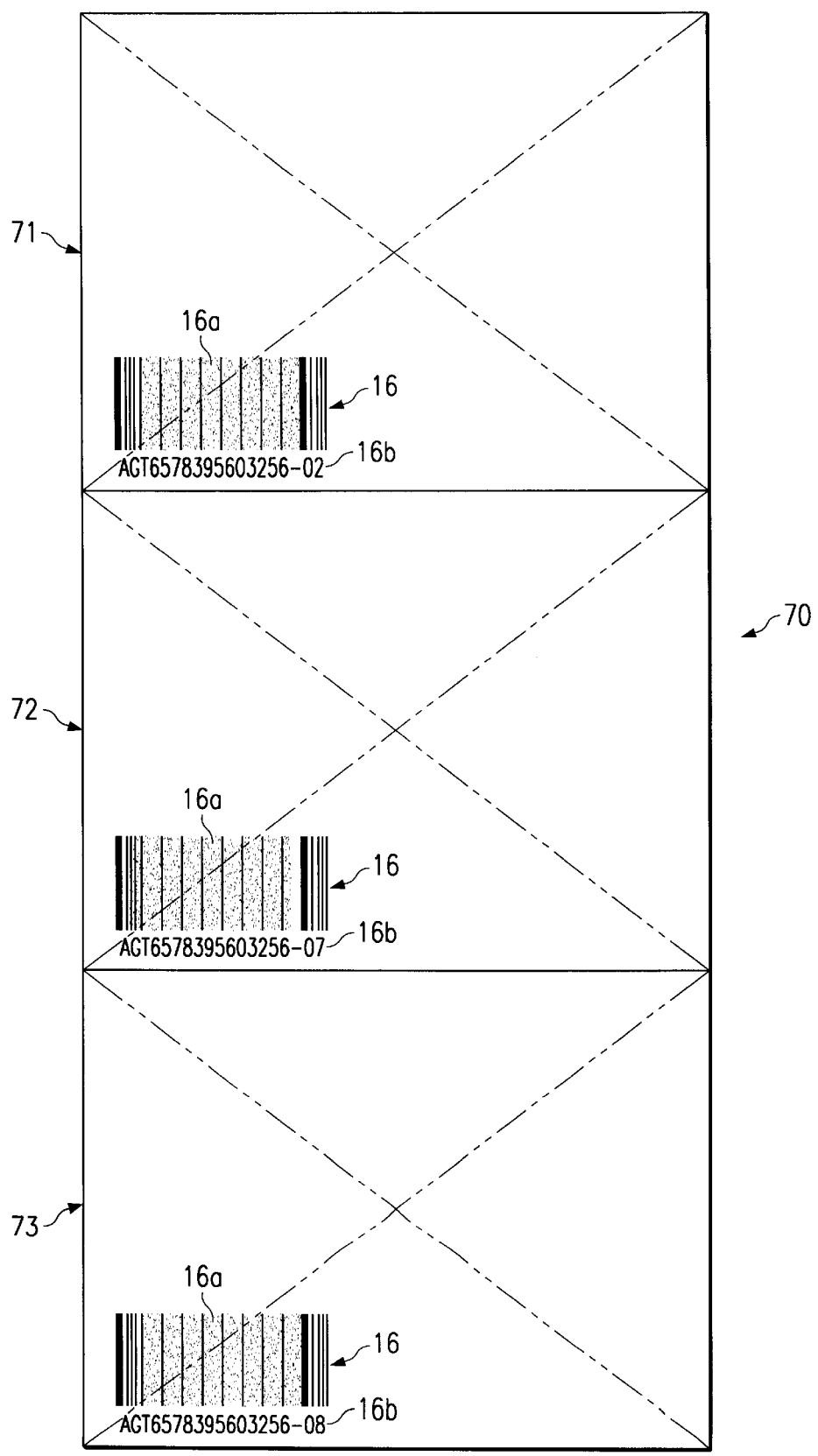
FIGS. 7A–7C show a series of preprinted blank forms.
Figure 7B:
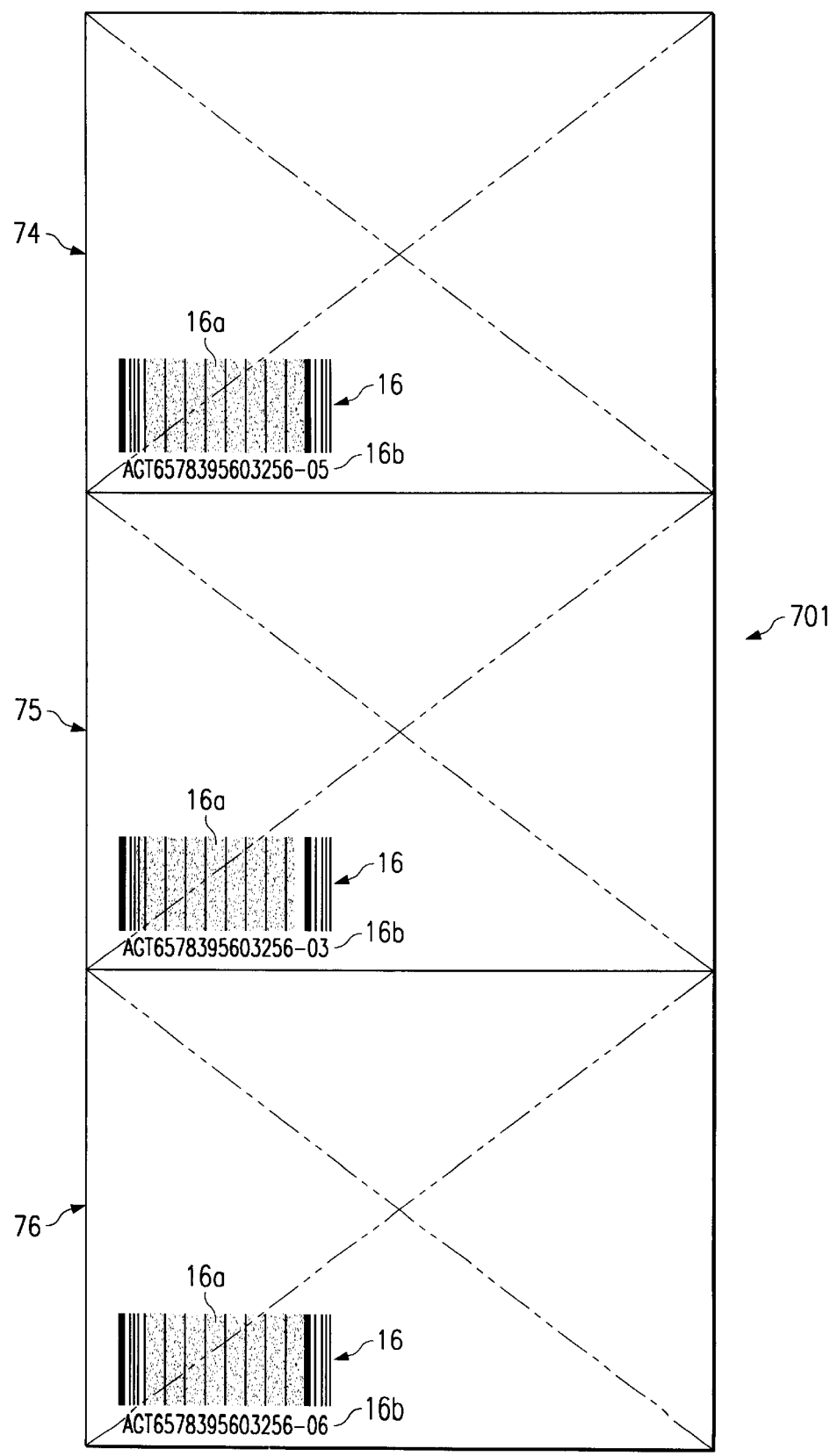
Figure 7C:
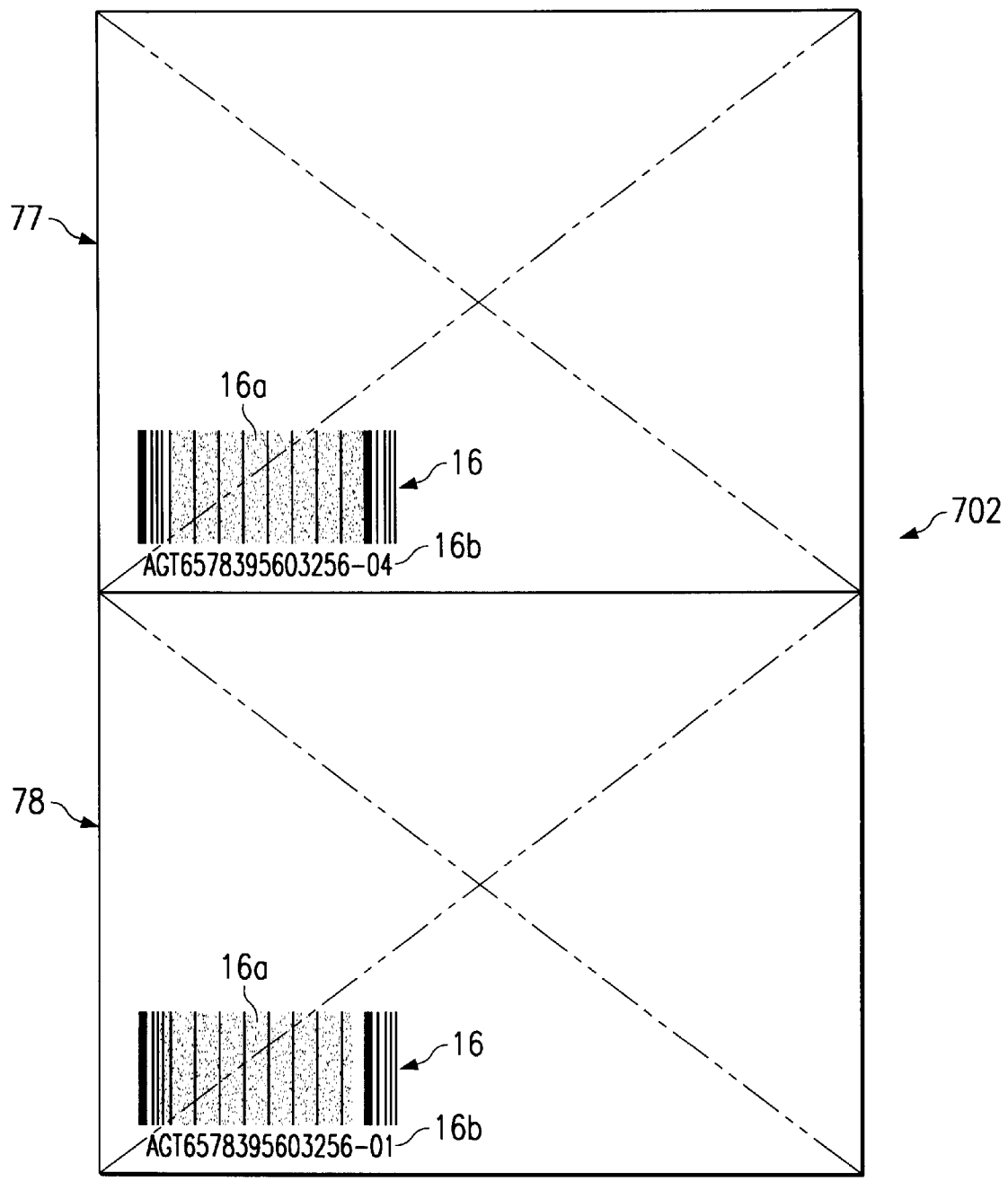
Figure 8A:
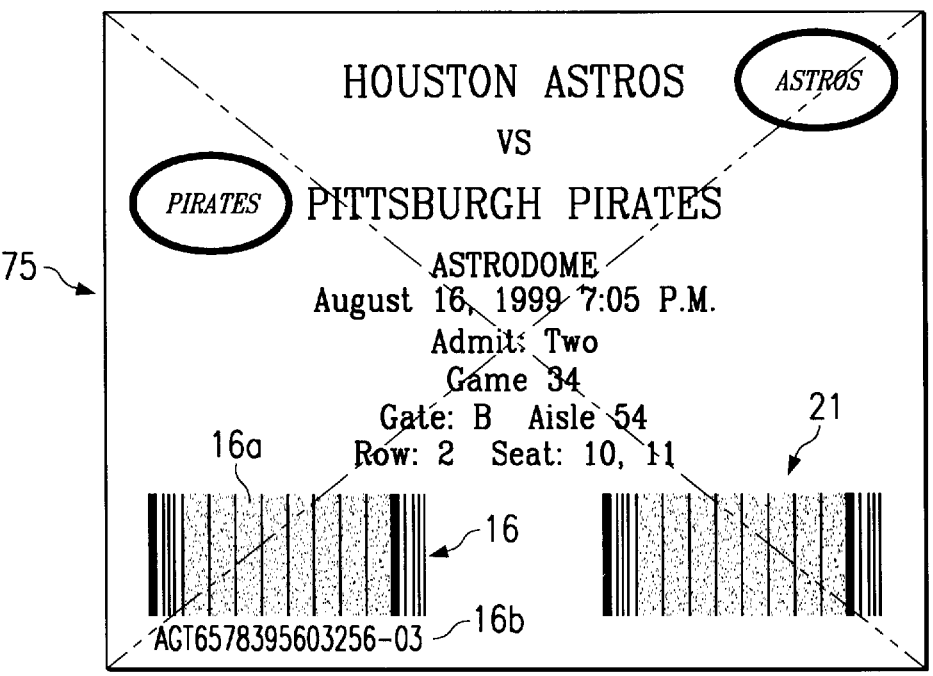
FIGS. 8A–8D show tickets printed using the blank forms of FIGS. 7A–7C.
Figure 8B:
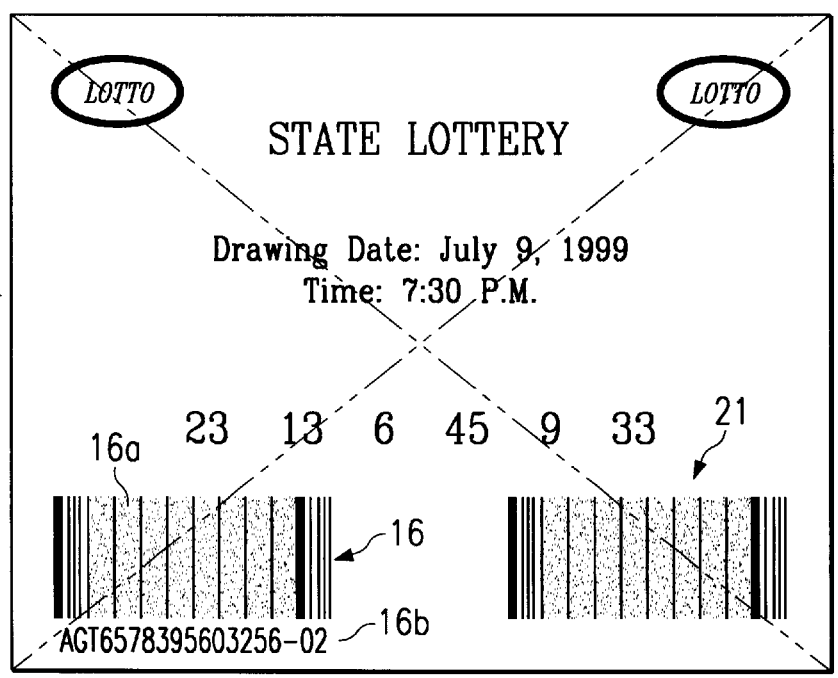
Figure 8C:
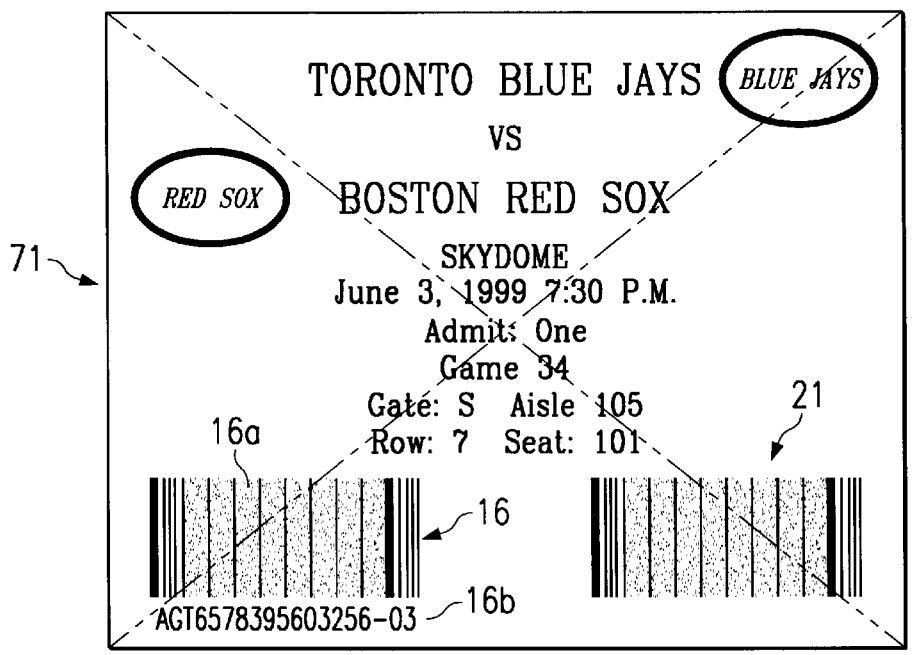
Figure 8D:
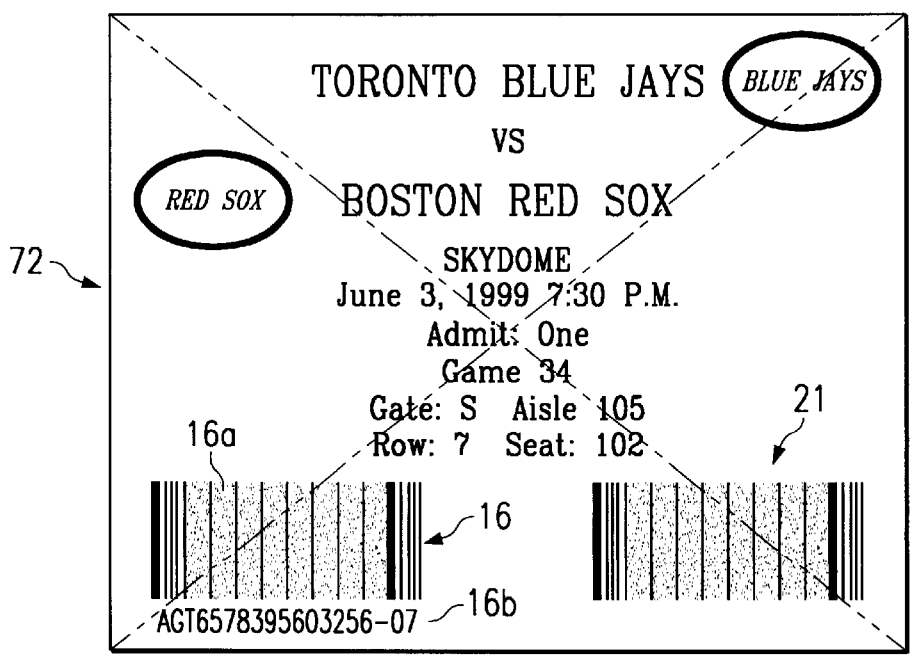

FIG. 7A shows blank stock 70 which has been divided into three sections 71, 72, 73 each having printed thereon an indicia 16, which has a machine readable part and a human readable part. Note that the last two digits in our example 02, 07 and 08 are individual to each form with respect to sections 71, 72 and 73 and need not be in sequential order. These individual last digits could signify the actual sheet number of a form 70 or the individual section number. Blank stock 701 of FIG. 7B has three more sections 74, 75, 76 and blank stock 702 of FIG. 7C has an additional two sections 77, 78. These sections could all be part of one long roll of forms or could be different form sheets with different numbers of blanks thereon.

Turning to FIGS. 8A, 8B, 8C and 8D, a user having a sheet of blank form 70 inserted in the user's printer may order a series of tickets for different sporting events, theaters, lotteries and the like. The user upon connection to a common server which serves several different such sporting events may order and pay for the tickets which will printed as discussed above. These are shown in FIGS. 8A, 8B, 8C and 8D.

Note that indicia 16 can be printed on the sheet and can include either or both machine readable and human readable sections and also this mark may be presented to the users in various forms, one of which could be watermarks built into the paper which could be uniquely identified if desired. Also note that this system could be utilized for printing travelers checks and other commercial paper following the procedures outlined above. These checks would then have printed on them the proper logos and markings for signature by the user when the user utilizes the printed "check" to purchase goods or services. The check would have printed on it the printed indicia as well as the initial indicia so that the acceptor of the travelers check could, if desired, run the check through a scanner or other reading device to determine the authenticity of the check.

Note also that when a consumer is ordering tickets, the ordering need not be from the same seller but may be from a plurality of sellers. For instance, the user may call for baseball tickets to one seller, football tickets to another and perhaps call for tickets at a distant city. In each case, the seller would utilize the information transmitted by the seller which is unique to the ticket stock currently in the printer. This information would be communicated by the seller's system to a central database to determine what physical position on the ticket stock this particular ticket should be printed and to also determine whether the unique number identified with this ticket has been previously utilized. Thus, user can have printed at their own printers tickets for many diverse events using this system.

Note also that while in the embodiment, the purchaser transmits the unique data pertaining to the stock material to the seller, a system could be devised whereby the unique information is sent by a third party in response to a trigger supplied by the user. This trigger could be automatically generated by the printer scanning the paper and accessing a remote or local data base, or by the data base keeping track of the user's use of the stock and sending the next number in a sequence. The unique code on the stock could, for example, be printed at the time of the transaction under control of a source other than the seller.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method for establishing the validity of a display created by a general purpose creation device, said method comprising the steps of:
    placing in said device media upon which information may be created, said media having preestablished thereon data which is unique to said media; and
    communicating at least a portion of said preestablished data to a location independent from said device, said independent location operable to create on said media a security indicia, said security indicia created in part by information contained in said preestablished media data and whereby said security indicia is validatable at a subsequent time partially under control of data contained in said preestablished media data;
    wherein said media is paper, and wherein said device is a general purpose printer;
    wherein said paper is divided into sections, each section adapted for printing thereon information pertaining to a different function, each such function having associated therewith a security indicia.

2. The method of claim 1 wherein created source of ones of said security indicia is validated by key information contained in at least a portion of said preestablished data.

3. The method of claim 2 wherein said key information is contained in a machine readable portion of said preestablished data.

4. The method of claim 1 wherein at least one portion of at least one of said sections contains means for allowing at least that section to become disassociated from the other sections.

5. The method of claim 4 wherein said disassociated section contains means for attaching said section to an object.

6. The method of claim 5 wherein said object is luggage and wherein the material printed on said section includes destination information of said luggage corresponding to destination information printed on at least one other section of said media.

7. The method of claim 5 wherein said attaching means includes a sticky surface selectively exposable by a user of said section.

8. The method of creating at a particular location a receipt indicative of a prior transaction between a purchaser and a seller of service, said receipt having self proving capability, and said particular location being remote from said seller, said method comprising the steps of:
    communicating to said seller data which is unique to the material upon which the receipt is to be generated;
    said seller verifying satisfaction with said unique data; and
    said seller communicating to said particular location data for associating with said receipt material, said last-mentioned data operable at said particular location for creating said receipt; said seller transmitted data including at least one machine decodable portion, the key to said decodable portion contained within at least a portion of data which is unique to said receipt material.

9. The method of claim 8 wherein said unique data is preassociated with said receipt material.

10. The method of claim 8 wherein said unique data is printed on said receipt material, and contains both a human readable portion and a machine readable portion.

11. The method of claim 8 wherein said verifying step includes checking to insure that the unique data is not a duplicate.

12. The method of claim 8 wherein said purchaser may have communication access to a plurality of sellers, each seller having the capability of sending different display data.

13. The method of claim 8 wherein said verifying step includes accessing a data base common to all of said sellers.

14. The method of claim 8 further including the step of:
    transmitting from the seller to a transaction data base data pertaining to the transaction which is the subject of said receipt.

15. The method of claim 8 wherein said particular location is the same as the location of said purchaser.

16. The method of claim 8 wherein said particular location is different from both said seller and said purchaser.

17. The method of claim 8 further including the steps of:
    presenting said receipt to a gatekeeper at a transaction location; and
    said gatekeeper verifying the authenticity of said receipt under control of data which is unique to said receipt.

18. The method of claim 17 wherein said gatekeeper verification step includes the step of:
    obtaining said key from said unique data.

19. The method of claim 8 wherein said receipt material is stock printable from a printer located at the particular location.

20. The method of claim 19 wherein said checking step is local to said seller.

21. The method of claim 19 wherein said checking step is remote to said seller and shared between a plurality of other sellers all having the possibility of communication access with said purchaser from time to time.

22. The method of claim 19 wherein said unique data is established on said printable stock prior to said communication with said seller.

23. The method of claim 22 wherein said stock has multiportions and wherein said method is operable for printing different data on selected portions of said stock.

24. The method of claim 23 wherein at least one of said portions is a luggage ticket and another of said portions is a boarding pass.

25. The system of creating at a particular location a receipt indicative of a prior transaction between the purchaser and a seller of service, said receipt having self proving capability, said system comprising:

means for communicating to said seller data which is unique to the material upon which the receipt is to be generated;

means associated with said seller for verifying satisfaction with said unique data and for said seller communicating to said particular location display data for associating with said display material, said display material operable at said particular location for creating said receipt; said seller transmitted display data including at least one machine decodable portion, the key to said decodable portion contained within at least a portion of data which is unique to said receipt material.

26. The system of claim 25 wherein said unique data is established on said printable stock prior to said communication with said seller.

27. The system of claim 25 wherein said purchaser may have communication access to a plurality of sellers, each seller having the capability of sending different display data.

28. The system of claim 25 wherein said verifying means includes means for accessing a data base common to all of said sellers.

29. The system of claim 25 further including:

means for transmitting from the seller to a transaction data base data pertaining to the transaction which is the subject of said receipt.

30. The system of claim 25 further including:

presenting said receipt to a gatekeeper at a transaction location; said gatekeeper enabling means for verifying the authenticity of said receipt under control of data which is unique to said receipt.

31. The system of claim 30 wherein said last-mentioned verifying means includes obtaining said key from said unique data.

32. The system of claim 25 wherein said unique data is preassociated with said receipt material.

33. The system of claim 32 wherein said unique data is printed on said receipt material, and contains both a human readable portion and a machine readable portion.

34. The system of claim 32 wherein said receipt material is stock printable from a printer located at the particular location.

35. The system of claim 25 wherein said verifying means includes means for checking to insure that the unique data is not a duplicate.

36. The system of claim 35 wherein said checking means is local to said seller.

37. The system of claim 35 wherein said checking means is remote to said seller and shared between a plurality of other sellers all having the possibility of communication access with said purchaser from time to time.

38. The system of authenticating data on a transaction receipt, said system comprising means for presenting said receipt to a gatekeeper; and means under control of said gatekeeper for authenticating said receipt by decoding a portion of data contained on said receipt under control of a decode key contained within data unique to said receipt.

39. The system of claim 38 wherein said decode key is machine readable.

40. The system of claim 38 wherein said machine readable key is preprinted on said receipt prior to the printing thereon of said receipt data.

41. The system of claim 38 wherein said authenticating means includes:

means for determining if this receipt is expected within the presentation parameters.

42. A system for establishing the validity of a display, said system comprising:

a device for creating said display on media containing preestablished data which is unique to said media; and communicating at least a portion of said preestablished data to a location independent from said creation device, said independent location operable to create on said media in conjunction with said creation device a security indicia, as part of a human readable display, said security indicia created in part by information contained in said preestablished media data and whereby said security indicia is validatible at a subsequent time partially under control of data contained in said preestablished media data;

wherein said media is paper, and wherein said device is a nonsecure printer;

wherein said paper is divided into sections, each section adapted for printing thereon information pertaining to a different display, each such display having associated therewith a security indicia.

43. The system of claim 42 further including the step of disconnecting each of said sections so that each said section can be used independently from the other said sections.

44. The system of claim 42 wherein the sections control the delivery of mail pieces when said security indicia is created thereon.

45. The system of claim 42 wherein the media is paper and wherein the security indicia includes the monetary amount available to a holder of the media.

46. The system of claim 42 wherein the security indicia includes a human readable portion which contains financial information.

47. The system of claim 46 wherein said financial information includes a check.

48. The system of claim 42 wherein each said display is generated from the same preestablished data.

49. The system of claim 48 wherein the human readable portion of each said display is identical to all the other human readable displays on the media.

50. The system of claim 48 wherein the security portion of each said identical display is different.

51. The system of claim 48 wherein the security portion of each said identical display is the same.

52. A method for verifying the authenticity of a document, wherein said document was previously created on a stock, comprising:

decoding a first indicia, that was pre-printed on said stock before creation of said document, to determine a unique code, wherein said unique code includes an encryption key;

decoding a second indicia that is included in said document to determine encrypted authentication information;

decrypting said encrypted authentication information in accordance with said encryption key; and selectively permitting a consumer to complete a commercial transaction in accordance with said authentication information.

53. The method of claim 52 further comprising:

determining whether said unique code has been previously used to complete another commercial transaction.

54. The method of claim 52 further comprising:

determining whether said unique code is within an acceptable range for said consumer.

55. The method of claim 52 wherein said first indicia comprises a bar code.

56. The method of claim 52 wherein said first indicia comprises human-readable information.

57. The method of claim 52 wherein said second indicia comprises a machine-readable information.

58. The method of claim 52 further comprising:

updating a database to indicate that said unique code has been utilized to complete said commercial transaction.

59. The method of claim 52 wherein said document is a check.

60. A system for verifying the authenticity of a document, wherein said document was previously created on a stock, comprising:

means for decoding a first indicia, that was pre-printed on said stock before creation of said document, to determine a unique code, wherein said unique code includes an encryption key;

means for decoding a second indicia that is included in said document to determine encrypted authentication information;

means for decrypting said encrypted authentication information in accordance with said encryption key; and means for presenting said authentication information to a gatekeeper to allow said gatekeeper to selectively permit completion of a commercial transaction by a consumer.

61. The system of claim 60 further comprising:

means for determining whether said unique code has been previously used to complete another commercial transaction.

62. The system of claim 60 further comprising:

means for determining whether said unique code is within an acceptable range for said consumer.

63. The system of claim 60 wherein said first indicia comprises a bar code.

64. The system of claim 60 wherein said first indicia comprises human-readable information.

65. The system of claim 60 wherein said second indicia comprises a machine-readable information.

66. The system of claim 60 further comprising:

means for updating a database to indicate that said unique code has been utilized to complete said commercial transaction.

67. The system of claim 60 wherein said document is a check.

\* \* \* \* \*

US006735575C1

(12) EX PARTE REEXAMINATION CERTIFICATE (8470th)
United States Patent
Kara

(10) Number: US 6,735,575 C1
(45) Certificate Issued: Aug. 16, 2011

(54) VERIFYING THE AUTHENTICITY OF PRINTED DOCUMENTS

(75) Inventor: Salim G. Kara, Thornhill, CA (US)

(73) Assignee: Kara Technology Incorporated, Houston, TX (US)

Reexamination Request:
No. 90/009,704, Apr. 29, 2010

Reexamination Certificate for:
Patent No.: 6,735,575
Issued: May 11, 2004
Appl. No.: 09/324,241
Filed: Jun. 2, 1999

(51) Int. Cl.
*G06F 17/60* (2006.01)

(52) U.S. Cl. .................. 705/50; 283/57; 283/73
(58) Field of Classification Search .......... 705/50
See application file for complete search history.

(56) References Cited

U.S. PATENT DOCUMENTS

| | | |
|---|---|---|
| 3,990,558 A | 11/1976 | Ehrat |
| RE33,498 E | 12/1990 | Proulx et al. |
| 5,432,506 A | 7/1995 | Chapman |
| 5,489,096 A | 2/1996 | Aron |
| 5,772,510 A | 6/1998 | Roberts |
| 6,111,953 A | 8/2000 | Walker et al. |
| 6,170,744 B1 | 1/2001 | Lee et al. |
| 6,208,980 B1 | 3/2001 | Kara |

*Primary Examiner* — Joseph R. Pokrzywa

(57) ABSTRACT

Preprinted forms are used in a general purpose printing device to allow for the subsequent verification of the authenticity of a printed document such as a ticket for transportation services. In operation, the user accesses the seller of the goods/services and during an information exchange with the seller the user inputs at least a portion of the preprinted data from the form. The seller then uses this information to formulate a printable control indicia which is then printed on the form at the user's location. When the form is subsequently presented to the seller, for example when the user attempts to board an aircraft using the form he/she printed, the preprinted portion of the form is used to obtain a decipher key which in turn is used to decipher the control indicia. Inability to decode the control indicia indicates that the printed material on the form may not be authentic.

At the time of issuance and publication of this certificate, the patent remains subject to pending reissue application number 11/431,162 filed May 9, 2006. The claim content of the patent may be subsequently revised in the reissue proceeding.

EX PARTE REEXAMINATION CERTIFICATE ISSUED UNDER 35 U.S.C. 307

THE PATENT IS HEREBY AMENDED AS INDICATED BELOW.

AS A RESULT OF REEXAMINATION, IT HAS BEEN DETERMINED THAT:

Claims 1, 4, 5, 7, and 42 are cancelled.

Claims 2, 3, 6, 8-41 and 43-67 were not reexamined.

* * * * *